United States Patent
Toepke et al.

(10) Patent No.: US 10,554,644 B2
(45) Date of Patent: Feb. 4, 2020

(54) TWO-FACTOR AUTHENTICATION FOR USER INTERFACE DEVICES IN A PROCESS PLANT

(71) Applicant: FISHER-ROSEMOUNT SYSTEMS, INC., Round Rock, TX (US)

(72) Inventors: Todd M. Toepke, Eden Prairie, MN (US); Joseph D. Fisher, Minnetonka, MN (US); Christopher P. Kantzes, Minneapolis, MN (US); Neil J. Peterson, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 226 days.

(21) Appl. No.: 15/214,949

(22) Filed: Jul. 20, 2016

(65) Prior Publication Data
US 2018/0026954 A1    Jan. 25, 2018

(51) Int. Cl.
H04L 29/06 (2006.01)
H04W 12/06 (2009.01)
G06F 21/31 (2013.01)

(52) U.S. Cl.
CPC .......... *H04L 63/08* (2013.01); *G06F 21/31* (2013.01); *H04L 63/083* (2013.01);
(Continued)

(58) Field of Classification Search
None
See application file for complete search history.

(56) References Cited

U.S. PATENT DOCUMENTS 4,741,031 A * 4/1988 Grandstaff .............. H04M 1/18
379/373.01
5,136,630 A * 8/1992 Breneman ............... H04M 1/18
455/401

(Continued)

FOREIGN PATENT DOCUMENTS

| CN | 101410800 A | 4/2009 |
|---|---|---|
| EP | 1 816 530 A1 | 8/2007 |

(Continued)

OTHER PUBLICATIONS

Beamex MC5 (discontinued) description, Retrieved from the Internet at http://www.beamex.com/beamex_products/MC5-%28discounted%29/na15ghgl/355ca6b7-66ff-469f-9bd4-1f26c0870452#Features> (Jul. 8, 2016).

(Continued)

*Primary Examiner* — Maung T Lwin
*Assistant Examiner* — Olanrewaju J. Bucknor
(74) *Attorney, Agent, or Firm* — Marshall, Gerstein & Borun LLP

(57) ABSTRACT

Techniques for performing two-factor authentication in a process plant include receiving, at a user interface device, a first type of identification information for a user from an identification device or a physical trait of the user. The user interface device also receives a second type of identification information for the user from knowledge-based information provided by the user. The user interface device then determines that each type of identification information corresponds to the same authorized user within the process plant. When both types of identification information are for the same authorized user, the user is granted access to the user interface device. Accordingly, the user may execute functions on the user interface device to perform operations on a plant asset which is connected to the user interface device.

17 Claims, 9 Drawing Sheets

(52) U.S. Cl.
CPC .......... *H04L 63/0853* (2013.01); *H04L 63/10* (2013.01); *H04L 63/105* (2013.01); *H04W 12/06* (2013.01)

(56) References Cited

U.S. PATENT DOCUMENTS

| | | | |
|---|---|---|---|
| 5,999,740 | A | 12/1999 | Rowley |
| 6,035,423 | A | 3/2000 | Hodges et al. |
| 6,282,709 | B1 | 8/2001 | Reha et al. |
| 6,889,166 | B2 | 5/2005 | Zielinski et al. |
| 7,010,294 | B1 | 3/2006 | Pyotsia et al. |
| 7,016,741 | B2 | 3/2006 | Arntson |
| 7,177,122 | B2 | 2/2007 | Hou et al. |
| 7,227,656 | B1 | 6/2007 | Kato |
| 7,289,994 | B2 | 10/2007 | Nixon et al. |
| 7,328,078 | B2 | 2/2008 | Sanford et al. |
| 7,421,531 | B2 | 9/2008 | Rotvold et al. |
| 7,539,978 | B1 | 5/2009 | Haddox et al. |
| 7,620,948 | B1 | 11/2009 | Rowe et al. |
| 7,675,932 | B2 | 3/2010 | Schumacher |
| 7,840,296 | B2 | 11/2010 | Sanford et al. |
| 7,975,266 | B2 | 7/2011 | Schneider et al. |
| 8,055,371 | B2 | 11/2011 | Sanford et al. |
| 8,127,241 | B2 | 2/2012 | Blevins et al. |
| 8,204,717 | B2 | 6/2012 | McLaughlin et al. |
| 8,286,154 | B2 | 10/2012 | Kaakani et al. |
| 8,458,659 | B2 | 6/2013 | Resnick et al. |
| 8,626,916 | B2 | 1/2014 | Armstrong et al. |
| 8,766,794 | B2 | 7/2014 | Ferguson et al. |
| 9,003,387 | B2 | 4/2015 | Van Camp et al. |
| 9,244,455 | B2 | 1/2016 | Peterson et al. |
| 2004/0039458 | A1 | 2/2004 | Mathiowetz et al. |
| 2004/0181787 | A1 | 9/2004 | Wickham et al. |
| 2004/0230401 | A1 | 11/2004 | Duren et al. |
| 2005/0132349 | A1 | 6/2005 | Roberts et al. |
| 2005/0228798 | A1 | 10/2005 | Shepard et al. |
| 2005/0268107 | A1* | 12/2005 | Harris .................. G06F 21/31 713/182 |
| 2007/0004168 | A1 | 1/2007 | Zips |
| 2007/0022403 | A1 | 1/2007 | Brandt et al. |
| 2007/0118699 | A1 | 5/2007 | Synard et al. |
| 2007/0169079 | A1 | 7/2007 | Keller et al. |
| 2007/0183108 | A1* | 8/2007 | Uhlenberg ............. H02H 9/008 361/91.1 |
| 2008/0040449 | A1 | 2/2008 | Grant et al. |
| 2008/0049984 | A1 | 2/2008 | Poo et al. |
| 2008/0126005 | A1 | 5/2008 | Guenter et al. |
| 2008/0268784 | A1 | 10/2008 | Kantzes et al. |
| 2009/0094462 | A1 | 4/2009 | Madduri |
| 2009/0133012 | A1 | 5/2009 | Shih |
| 2009/0138870 | A1 | 5/2009 | Shahindoust et al. |
| 2009/0283583 | A1* | 11/2009 | Cowburn ............. G06Q 10/087 235/375 |
| 2009/0320125 | A1 | 12/2009 | Pleasant, Jr. et al. |
| 2010/0146497 | A1 | 6/2010 | Kogan et al. |
| 2010/0189251 | A1* | 7/2010 | Curren ................ G06F 21/6227 380/28 |
| 2011/0072506 | A1* | 3/2011 | Law .................... H04L 63/0227 726/11 |
| 2011/0087461 | A1 | 4/2011 | Hollander et al. |
| 2011/0224808 | A1 | 9/2011 | Lucas et al. |
| 2012/0038760 | A1 | 2/2012 | Kantzes et al. |
| 2013/0024495 | A1 | 1/2013 | Armstrong et al. |
| 2013/0070745 | A1 | 3/2013 | Nixon et al. |
| 2013/0151849 | A1* | 6/2013 | Graham .................. H04L 9/32 713/164 |
| 2013/0214898 | A1 | 8/2013 | Pineau et al. |
| 2013/0232541 | A1* | 9/2013 | Kapadia ................ G06F 21/33 726/1 |
| 2013/0290706 | A1* | 10/2013 | Socky .................. G06F 21/445 713/158 |
| 2014/0018955 | A1 | 1/2014 | Asakawa et al. |
| 2014/0019768 | A1 | 1/2014 | Pineau et al. |
| 2014/0047107 | A1 | 2/2014 | Maturana et al. |
| 2014/0056173 | A1 | 2/2014 | Nakamura et al. |
| 2014/0096212 | A1* | 4/2014 | Smith .................... G06F 21/34 726/7 |
| 2014/0165182 | A1* | 6/2014 | Curry .................. H04L 63/0209 726/12 |
| 2014/0181955 | A1 | 6/2014 | Rosati |
| 2014/0273847 | A1 | 9/2014 | Nixon et al. |
| 2014/0277615 | A1* | 9/2014 | Nixon .................. G05B 11/01 700/83 |
| 2014/0282015 | A1* | 9/2014 | Nixon .................. G05B 11/01 715/733 |
| 2014/0282257 | A1* | 9/2014 | Nixon .................. G05B 11/01 715/835 |
| 2015/0024710 | A1 | 1/2015 | Becker et al. |
| 2015/0098158 | A1 | 4/2015 | Kemp et al. |
| 2015/0281227 | A1 | 10/2015 | Fox Ivey et al. |
| 2015/0287318 | A1* | 10/2015 | Nair .................... G08C 17/02 340/5.52 |
| 2016/0026813 | A1 | 1/2016 | Neitzel et al. |
| 2016/0132046 | A1 | 5/2016 | Beoughter et al. |
| 2016/0154394 | A1 | 6/2016 | Peterson et al. |
| 2016/0299175 | A1 | 10/2016 | Dewey et al. |
| 2016/0359636 | A1* | 12/2016 | Kreft .................... G06F 21/71 |
| 2016/0359866 | A1* | 12/2016 | Mixer .................. H04L 63/0876 |
| 2017/0078265 | A1 | 3/2017 | Sundaresh et al. |
| 2017/0199979 | A1* | 7/2017 | Reiner .................. G16H 50/30 |
| 2017/0257378 | A1 | 9/2017 | Sprenger et al. |

FOREIGN PATENT DOCUMENTS

| | | |
|---|---|---|
| EP | 1 906 623 A1 | 4/2008 |
| EP | 2 026 223 A2 | 2/2009 |
| EP | 2 067 088 A2 | 6/2009 |
| EP | 2 782 073 A1 | 9/2014 |
| GB | 2 465 495 A | 5/2010 |
| GB | 2 535 839 A | 8/2016 |
| GB | 2 539 311 A | 12/2016 |
| GB | 2 548 007 A | 9/2017 |
| JP | 2002-007129 A | 1/2002 |
| JP | 2004-234056 A | 8/2004 |
| JP | 2009-187420 A | 8/2009 |
| WO | WO-2008/045258 A2 | 4/2008 |
| WO | WO-2013/184117 A1 | 12/2013 |
| WO | WO-2016/020165 A1 | 2/2016 |
| WO | WO-2017/085923 A1 | 5/2017 |

OTHER PUBLICATIONS

Beamex MC6 Advanced Field Calibrator and Communicator, Product Brochure (2016).
Examination Report Under Section 18(3) in Application No. GB1015879.8, dated Mar. 13, 2014.
Examination Report Under Section 18(3) in Application No. GB1015879.8, dated Mar. 20, 2015.
Examination Report under Section 18(3) dated Oct. 2, 2014 in Application No. GB1015879.8, 3 pgs.
First Office Action for corresponding Chinese Patent Application No. 201010572412.4, dated Jun. 5, 2014, 8 pgs.
Fluke 709 Precision Loop Calibrator, User Manual, © 2013 Fluke Corporation.
Fluke 709/709H Precision Loop Calibrator, Quick Reference Guide (2013).
GE Measurement & Control Systems, Druck DPI 620-IS advanced modular calibrator user manual, © Druck Limited 2010.
Office Action for corresponding Japanese Patent Application No. 2010-215391, dated Aug. 19, 2014, 4 pgs.
Search Report for Application No. GB1015879.8, dated Jan. 13, 2011.
U.S. Appl. No. 15/214,949, filed Jul. 20, 2016.
U.S. Appl. No. 15/216,810, filed Jul. 22, 2016.
User Manual for Beamex® MC6 Advanced Field Calibrator and Communicator (2012-2015).
Wiring and Installation 31.25 kbit/s, Voltage Mode, Wire Medium, Application Guide, FoundationTM Fieldbus, © 1996 Fieldbus Foundation.

(56) References Cited

OTHER PUBLICATIONS

Search Report for Application No. GB1709952.4, dated Nov. 29, 2017.
Search Report for Application No. GB1710027.2, dated Oct. 19, 2017.
Search Report for Application No. GB1710029.8, dated Dec. 21, 2017.
Search Report for Application No. GB1710117.1, dated Oct. 23, 2017.
Search Report for Application No. GB1710119.7, dated Oct. 24, 2017.
Search Report for Application No. GB1710124.7, dated Oct. 20, 2017.
Search Report for Application No. GB1710125.4, dated Oct. 12, 2017.
Search Report for Application No. GB1710210.4, dated Oct. 26, 2017.
Search Report for Application No. GB1710211.2, dated Nov. 30, 2017.
Search Report for Application No. GB1710266.6, dated Dec. 19, 2017.
Search Report for Application No. GB1711106.3, dated Nov. 21, 2017.
U.S. Appl. No. 15/214,975, filed Jul. 20, 2016.
U.S. Appl. No. 14/682,714, filed Apr. 9, 2015.
Costall, Sr., Sean, "Essential Concepts of Intrinsic Safety," Spark Institute (2013), 4 pages.
Instrinsic Safety (2016) Retrieved from the Internet at: <https://en.wikipedia.org/wiki/Intrinsic_safety>, 3 pages.
Digital Signal Transmission, Omega (2016) Retrieved from the Internet at: <https://www.omega.com/literature/transactions/volume2/digitalsignal4.html>, 5 pages.
User's Manual: 475 Field Communicator, Emerson Process Management (May 2015), 131 pages.
"Understanding What's Meant by 'Instrinsically Safe,'" Omega (2016) Retrieved from the Internet at: <http://www.omega.com/technical-learning/understanding-what-is-meant-by-intrinsically-safe.html>, 4 pages.
Fieldbus Engineer's Guide, Pepperl+Fuchs (May 2013), 474 pages.
"31,25 kbit/s Intrinsically Safe Systems," Fieldbus Foundation (2004), 77 pages.

* cited by examiner

Permissions
300

| Permission ID ⌐302 | Device ⌐304 | Access Types ⌐306 | Plant Area ⌐308 | Functions ⌐310 | Duration ⌐312 |
|---|---|---|---|---|---|
| 1 | Field Device A | R, R/W | A | Configuration, Troubleshoot, Calibrate | ∞ |
| 2 | Field Device B | R | B | Monitor | 30 min. |

| User ID | Job Function | Security Group | Permissions |
|---|---|---|---|
| 0001 | Configuration Engineer | 1, 2 | 1, 2, 3, 4 |
| 0002 | Maintenance Technician | 3 | 3, 5, 6, 8 |

FIG. 3B

User Interface Devices
360

| User Interface Device ID | Permissions | Licensed Functions |
|---|---|---|
| UI01 | 1, 2, 3, 4 | Configuration |
| UI02 | 10, 11, 12 | Configuration, Troubleshoot, Calibrate |

FIG. 3C

TWO-FACTOR AUTHENTICATION FOR USER INTERFACE DEVICES IN A PROCESS PLANT

FIELD OF THE DISCLOSURE

This disclosure relates generally to process control systems, and, more particularly, to receiving two types of identification (ID) to authenticate a user in a process plant.

BACKGROUND

Distributed process control systems, like those used in chemical, petroleum or other processes, typically include one or more process controllers and input/output (I/O) devices communicatively coupled to at least one host or operator workstation and to one or more field devices via analog, digital or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions, such as opening or closing valves, or measuring process parameters to control one or more processes executing within the process plant or system. Smart field devices, such as field devices conforming to the well-known Fieldbus protocol may also perform control calculations, alarming functions, and other control functions commonly implemented within a controller. The process controllers, which are also typically located within the plant environment, receive signals indicative of process measurements made by sensors or field devices and/or other information pertaining to the field devices and execute a controller application that runs, for example, different control modules that make process control decisions, generate control signals based on the received information, and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers, or computing devices, data historians, report generators, centralized databases, or other centralized administrative computing devices that are typically, but not always, placed in control rooms or other locations away from the harsher plant environment. Each of these hardware devices typically, though not always, is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more operator workstations or computing devices, enables users to create or change process control modules and download these process control modules via a data highway to dedicated distributed controllers. Typically, these control modules are made up of communicatively interconnected function blocks, which perform functions within the control scheme based on inputs thereto and which provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the operator interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As noted above, operator display applications are typically implemented on a system wide basis in one or more of the workstations and provide displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally configured to display, in known manners, information or data received from the process control modules or the devices within the process plant. In some known systems, displays have a graphic associated with a physical or logical element that is communicatively tied to the physical or logical element to receive data about the physical or logical element. The graphic may be changed on the display screen based on the received data to illustrate, for example, that a tank is half full, to illustrate the flow measured by a flow sensor, etc.

In some known systems, operators use handheld or other portable computing devices (e.g., user interface (UI) devices) to configure, troubleshoot, calibrate, and perform other operations on plant assets within a process plant, which may include process control devices (e.g., controllers, field devices, etc.), rotating equipment (e.g., motors, pumps, compressors, drives), mechanical vessels (e.g., tanks, pipes, etc.), electrical power distribution equipment (e.g., switch gear, motor control centers), or any other equipment within a process plant. For example, an operator may physically attach a UI device to a field device and may then communicate with the field device via the UI device. However, the UI devices are not equipped with authentication requirements, such as entering login information. As a result, anyone within a process plant may obtain a UI device and make changes to plant assets. This may allow for unauthorized personnel to access any plant asset within the process plant.

SUMMARY

A UI device performs two-factor authentication to allow a user to access the UI device and perform operations on a process control device or other plant asset which is connected to the UI device. More specifically, the UI device may receive a first type of identification information for a user which uniquely identifies the user. The first type of identification information may be from an identification device or may be a physical trait of the user. For example, the UI device may receive a Radio Frequency Identification (RFID) tag, such as a near field communications (NFC) signal, from an electronic ID card which belongs to the user. The RFID tag may include an employee ID number which uniquely identifies the user. Then the UI device may compare the employee ID number to stored employee ID numbers to verify and identify the user.

Additionally, the UI device may receive a second type of identification information for the user. The second type of identification information may be knowledge-based information which is information known by the user. For example, the second type of identification information may be user login information, such as a username and password provided by the user. The username and password may be compared to stored username and password combinations to verify and identify the user a second time. If the UI device identifies the same user based on the RFID tag and the user login information, the user is authenticated and provided access to the UI device. As a result, the user may perform operations on the connected r plant asset. In another example, the second type of identification information may be a passcode/personal identification number (PIN), which uniquely identifies the user. The passcode may be a numeric password, such as a 4 digit number or may be a swipe pattern on the UI device.

On the other hand, if the RFID tag does not correspond to one of the stored employee ID numbers, the username and/or password do not correspond to one of the stored username and password combinations, or the RFID tag and user login information do not correspond to the same user, then the user is denied access to the UI device. Accordingly, the user is not allowed to perform operations on the connected plant asset.

Also in some embodiments, in addition to authenticating the user, the UI device determines whether the user and the UI device are authorized to perform operations on the connected plant asset. The UI device may also determine the extent of the authorization for the user and the UI device, such as a time duration for the authorization, the functions which the user and the UI device are authorized to execute, the software licensed to the UI device, etc. When a user attempts to access a plant asset that the user is not permitted to access, the UI device may display a notification to the user that access is denied. Additionally, the UI device may transmit a notification to a server indicating that an unauthorized user attempted to access a particular plant asset. A system administrator may view the notification and take action. For example, the system administrator may add additional permissions to the unauthorized user so that the unauthorized user has access to the particular plant asset.

BRIEF DESCRIPTION OF THE DRAWINGS

FIGS. 3A-C illustrate example data tables which may be generated by a server and provided to a UI device to determine a level of authorization for a user;

DETAILED DESCRIPTION

Figure 1A:
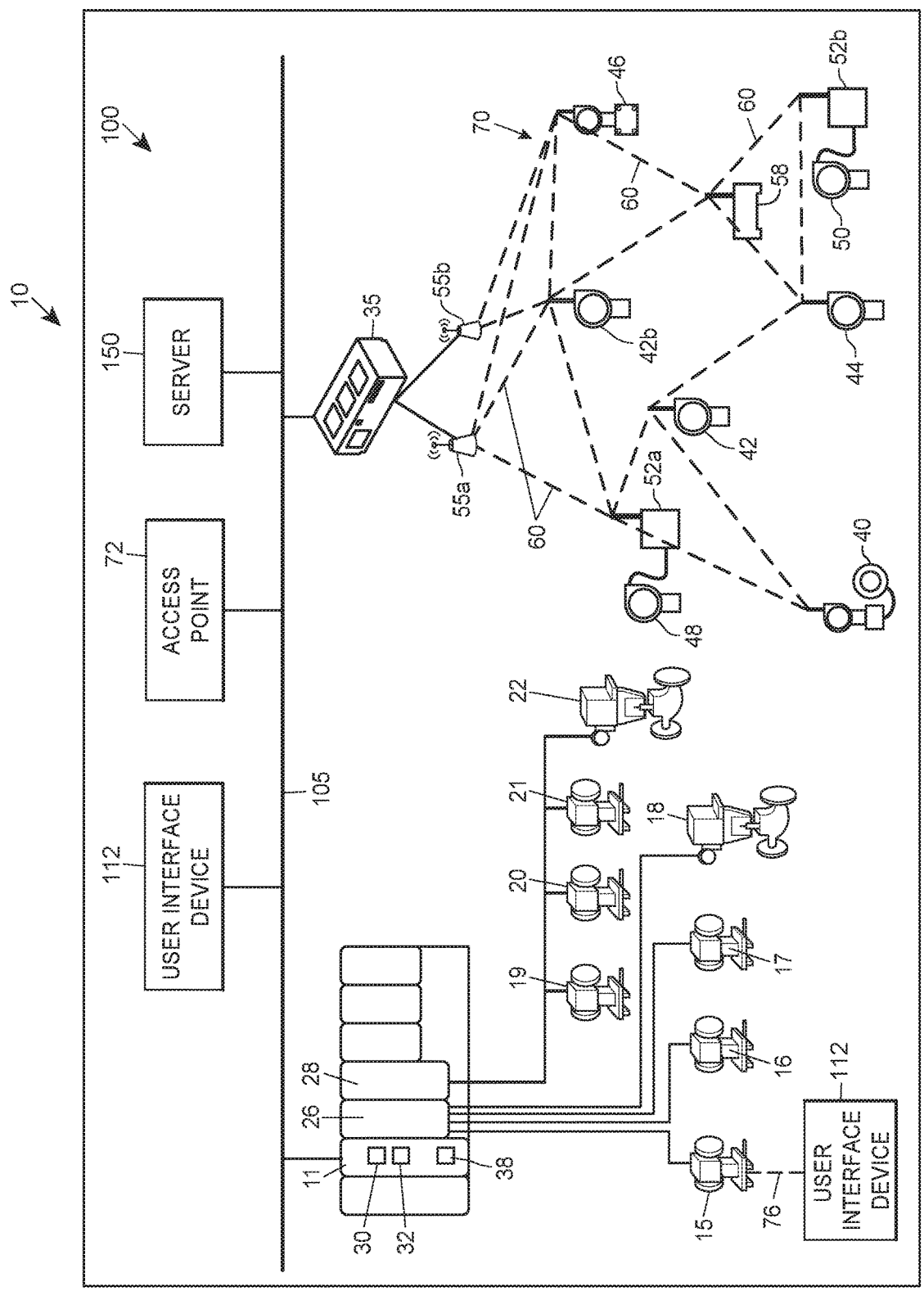
FIG. 1A is a block diagram of a distributed process control network located within a process plant including a UI device which performs two-factor authentication.

FIG. 1A is a block diagram of an exemplary process control network 100 operating in a process control system or process plant 10. The process control network 100 may include a network backbone 105 providing connectivity directly or indirectly between a variety of other devices. The devices coupled to the network backbone 105 include, in various embodiments, combinations of access points 72, UI devices 112 which may be handheld, servers 150, controllers 11, input/output (I/O) cards 26 and 28, wired field devices 15-22, wireless gateways 35, and wireless communication networks 70. The communication networks 70 may include wireless devices 40-58, which include wireless field devices 40-46, wireless adapters 52a and 52b, access points 55a and 55b, and a router 58. The wireless adapters 52a and 52b may be connected to non-wireless field devices 48 and 50, respectively. The controller 11 may include a processor 30, a memory 32, and one or more control routines 38. Though FIG. 1A depicts only a single one of some of the devices connected to the network backbone 105, it will be understood that each of the devices could have multiple instances on the network backbone 105 and, in fact, that the process plant 10 may include multiple network backbones 105.

The UI devices 112 may be communicatively connected to the controller 11 and the wireless gateway 35 via the network backbone 105. The controller 11 may be communicatively connected to wired field devices 15-22 via input/output (I/O) cards 26 and 28 and may be communicatively connected to wireless field devices 40-46 via the network backbone 105 and a wireless gateway 35. The controller 11 may operate to implement a batch process or a continuous process using at least some of the field devices 15-22 and 40-50. The controller 11, which may be, by way of example, the DeltaV™ controller sold by Emerson Process Management, is communicatively connected to the process control network backbone 105. The controller 11 may be also communicatively connected to the field devices 15-22 and 40-50 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1A, the controller 11, the field devices 15-22 and the I/O cards 26, 28 are wired devices, and the field devices 40-46 are wireless field devices.

In some embodiments, the UI device 112 may be brought to the site of one of the field devices 15-22, 40-50 in the process plant. The UI device 112 may be temporarily connected via a wired and/or a wireless connection 76 to the field device 15-22, 40-50 for calibrating, configuring, troubleshooting, monitoring, controlling, or performing any other suitable operations on the field device 15-22, 40-50. Additionally, the UI device 112 may be temporarily connected via a wired and/or wireless connection to the controller 11 for calibrating, configuring, troubleshooting, monitoring, controlling, or performing any other suitable operations on the controller 11. The UI device 112 may also be temporarily connected to any other plant asset (e.g., rotating equipment, mechanical vessels, electrical power distribution equipment, etc.) for calibrating, configuring, troubleshooting, monitoring, controlling, or performing any other suitable operations on the plant asset.

In operation of the UI device 112, the UI device 112 may, in some embodiments, execute a user interface (UI), allowing the UI device 112 to accept input via an input interface and provide output at a display. The UI device 112 may receive data (e.g., process related data such as process parameters, permissions, log data, sensor data, and/or any other data that may be captured and stored) from the server 150. In other embodiments, the UI may be executed, in whole or in part, at the server 150, where the server 150 may transmit display data to the UI device 112. The UI device 112 may receive UI data (which may include display data and permission data) via the backbone 105 from other nodes in the process control network 100, such as the controller 11, the wireless gateway 35, or the server 150.

In some embodiments, permissions may be generated at the server 150 by a system administrator, for example. Each permission may specify a level of access to a particular plant asset, such as read-only access, read/write access, access for calibration functions, access for configuration functions, etc. The system administrator may also assign permissions to users and UI devices in the process plant. In some embodiments, the server 150 may be communicatively coupled to one or more databases which store indications of the permissions, authorized users within the process plant, UI devices within the process plant, and associations between the permissions, users, and UI devices. The permissions as well as indications of the corresponding users and UI devices assigned to each permission may be transmitted to the UI device 112.

Accordingly, the UI device 112 may determine a level of authorization that the user has to a plant asset connected to the UI device 112 using the permissions assigned to the user and/or the UI device 112. As used herein, a level of authorization for a user may refer to a combined level of access that the user has to plant assets within the process plant. The combined level of access may be based on a set of permissions assigned to the user and/or the UI device 112, where each permission specifies a level of access to a particular plant asset. In some embodiments, a level of authorization for a user may also refer to a combined level of access that the user has to a particular plant asset. The combined level of access may be based on each of the permissions assigned to the user and/or the UI device 112 which specify a level of access to the particular plant asset.

Also as used herein, plant assets may include process control devices (e.g., controllers, field devices, etc.), rotating equipment (e.g., motors, pumps, compressors, drives), mechanical vessels (e.g., tanks, pipes, etc.), electrical power distribution equipment (e.g., switch gear, motor control centers), or any other equipment within a process plant. For ease of illustration only, the specification describes the scenario where the UI device is connected to a process control device. However, the UI device 112 may connect to any plant asset within the process plant.

Based on the UI data received at the UI device 112, the UI device 112 provides output (i.e., visual representations or graphics) indicating whether the user is authenticated and whether the user is authorized to access a particular process control device or other plant asset or function performed on the process control device or other plant asset. For example, the UI device 112 may provide an ID scan display requesting the user to scan an electronic ID card, as described in more detail below with reference to FIG. 2A. The UI device 112 may also provide a user login display requesting the user to enter a username and password or a passcode/PIN number, as described in more detail below with reference to FIG. 2B. The user may also affect control of the process by providing input at the UI device 112. To illustrate, the UI device 112 may provide indications of process parameters measured by a process control device which is connected to the UI device 112. The user may interact with the UI device 112 to calibrate the measurements taken by the process control device.

In certain embodiments, the UI device 112 may implement any type of client, such as a thin client, web client, or thick client. For example, the UI device 112 may depend on other nodes, computers, UI devices, or servers for the bulk of the processing necessary for operation of the UI device 112, as might be the case if the UI device is limited in memory, battery power, etc. (e.g., in a wearable device). In such an example, the UI device 112 may communicate with the server 150 or with another UI device, where the server 150 or other UI device may communicate with one or more other nodes (e.g., servers) on the process control network 100 and may determine the display data, permissions data, and/or process data to transmit to the UI device 112. Furthermore, the UI device 112 may pass any data related to received user input to the server 150 so that the server 150 may process the data related to user input and operate accordingly. In other words, the UI device 112 may do little more than render graphics and act as a portal to one or more nodes or servers that store the data and execute the routines necessary for operation of the UI device 112. A thin client UI device offers the advantage of minimal hardware requirements for the UI device 112.

In other embodiments, the UI device 112 may be a web client. In such an embodiment, a user of the UI device 112 may interact with the process control system via a browser at the UI device 112. The browser enables the user to access data and resources at another node or server (such as the server 150) via the backbone 105. For example, the browser may receive UI data, such as display data, permissions data, or process parameter data from the server 150, allowing the browser to depict graphics for controlling and/or monitoring some or all of the process. The browser may also receive user input (such as a mouse click on a graphic). The user input may cause the browser to retrieve or access an information resource stored on the server 150. For example, the mouse click may cause the browser to retrieve (from the server 150) and display information pertaining to the clicked graphic.

In yet other embodiments, the bulk of the processing for the UI device 112 may take place at the UI device 112. For example, the UI device 112 may determine a level of authorization for the user. The UI device 112 may also store, access, and analyze data locally.

In operation, a user may interact with the UI device 112 to monitor, configure, troubleshoot, calibrate, or control one or more plant assets in the process control network 100, such as any of the field devices 15-22, 40-50, the controller 11, rotating equipment (e.g., motors, pumps, compressors, drives), mechanical vessels (e.g., tanks, pipes, etc.), electrical power distribution equipment (e.g., switch gear, motor control centers), or any other equipment within the process plant. The user may also interact with the UI device 112, for example, to modify or change a parameter associated with a control routine stored in the controller 11. The processor 30 of the controller 11 implements or oversees one or more process control routines (stored in a memory 32), which may include control loops. The processor 30 may communicate with the field devices 15-22 and 40-50 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system may take any form, including software, firmware, hardware, etc. Control routines may be implemented in any desired software format, such as using object oriented programming, ladder logic, sequential function charts, function block diagrams, Electronic Device Description Language (EDDL), field device integration (FDI), or using any other software programming language or design paradigm. In particular, the control routines may be implemented by a user through the UI device 112. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured (by a user using a UI device 112 in certain embodiments) to implement a control strategy or control routine in any desired manner. In addition to control routines, the UI device 112 interacts with the controller 11 to execute other functions or transmit/receive other types of data.

Referring still to FIG. 1A, the wireless field devices 40-46 communicate in a wireless network 70 using a wireless protocol, such as the Wireless HART protocol. In certain embodiments, the UI device 112 may be capable of communicating with the wireless field devices 40-46 using the wireless network 70. Such wireless field devices 40-46 may directly communicate with one or more other nodes of the process control network 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-22 and 40-46 could conform to any other desired standard(s) or protocols, such as any wired or wireless protocols, including any standards or protocols developed in the future.

The wireless gateway 35 is an example of a provider device 110 that may provide access to various wireless devices 40-58 of a wireless communication network 70. In particular, the wireless gateway 35 provides communicative coupling between the wireless devices 40-58 and other nodes of the process control network 100 (including the controller 11 of FIG. 1A). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers.

Similar to the wired field devices 15-22, the wireless field devices 40-46 of the wireless network 70 may perform physical control functions within the process plant 10 (e.g., opening or closing valves or taking measurements of process parameters). The wireless field devices 40-46, however, are configured to communicate using the wireless protocol of the network 70. As such, the wireless field devices 40-46, the wireless gateway, and other wireless nodes 52-58 of the wireless network 70 are producers and consumers of wireless communication packets.

In some scenarios, the wireless network 70 may include non-wireless devices. For example, a field device 48 of FIG. 1A may be a legacy 4-20 mA device and a field device 50 may be a traditional wired HART device. To communicate within the network 70, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 70. The wireless devices 32-46 and 52-58 may communicate with each other and with the wireless gateway 35 over wireless links 60 of the wireless communication network 70.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as NFC and Bluetooth, or other wireless communication protocols. Typically, such wireless access points 72 allow handheld or other portable computing devices (e.g., UI devices) to communicate over a respective wireless network that is different from the wireless network 70 and that supports a different wireless protocol than the wireless network 70. For example, a UI device may be a mobile workstation or diagnostic test equipment that is utilized by a user within the process plant. In some embodiments, the UI device 112 communicates over the process control network 100 using a wireless access point 72. In some scenarios, in addition to portable computing devices, one or more process control devices (e.g., controller 11, field devices 15-22, or wireless devices 35, 40-58) may also communicate using the wireless network supported by the access points 72.

Although FIG. 1A illustrates a single controller 11 with a finite number of field devices 15-22, 40-50, this is only an illustrative and a non-limiting embodiment. Any number of controllers 11 may be included in the provider devices of the process control network 100, and any of the controllers 11 may communicate with any number of wired or wireless field devices 15-22, 40-50 to control a process in the plant 10. Furthermore, the process plant 10 may also include any number of wireless gateways 35, routers 58, access points 55, 72, and/or wireless process control communication networks 70.

To perform two-factor authentication, a UI device 112 receives multiple types of identification from a user. More specifically, the UI device 112 may receive physical or inherent identification information from an identification device (e.g., an electronic ID card, a social security card, a driver's license, etc.) or a physical trait of the user device (e.g., a fingerprint, a retinal image, etc.) as a first type of identification information. The UI device 112 may also receive knowledge-based identification information which is information known by the user (e.g., a username and password, an email address, a date of birth, an answer to a security question, a passcode/PIN number, etc.) as a second type of identification information.

Figure 1B:
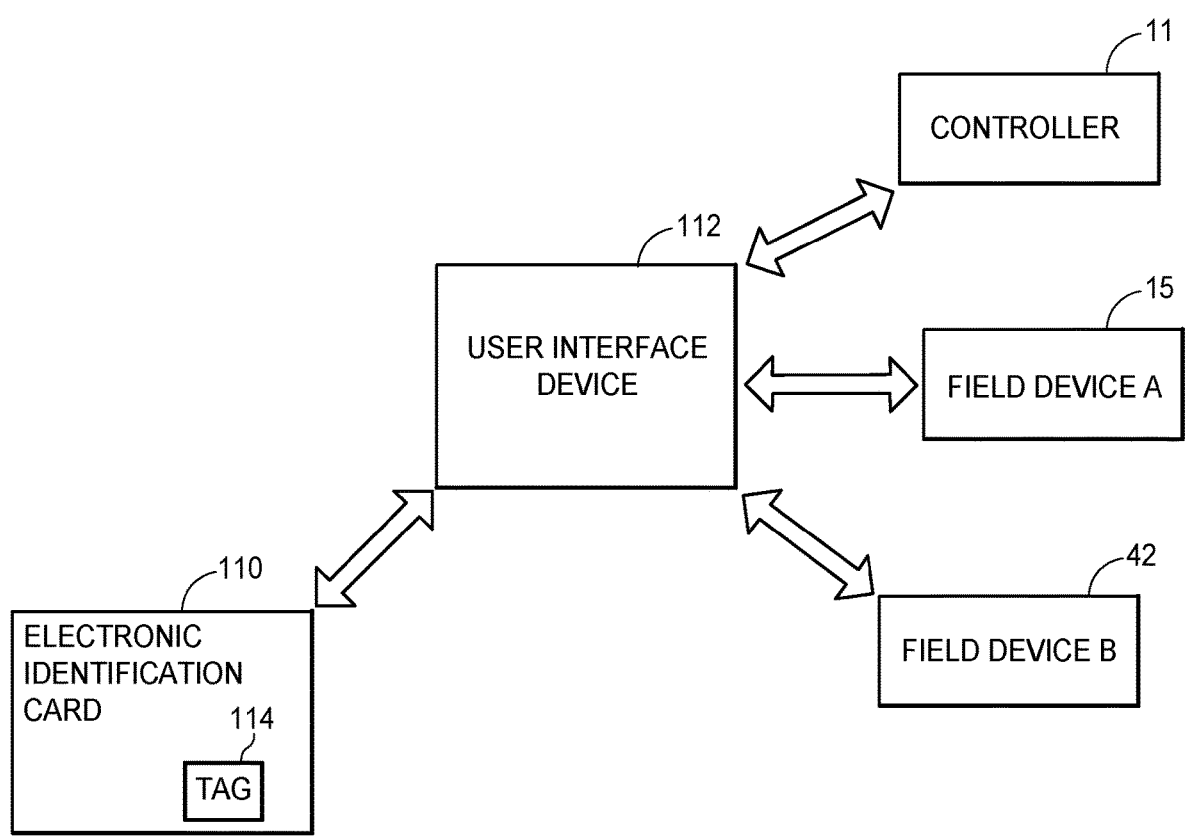
FIG. 1B is a block diagram of an example interaction between an electronic identification card, the UI device, and one or several process control devices within the process plant illustrated in FIG. 1A.

FIG. 1B illustrates a block diagram of an example interaction between the UI device 112, an electronic ID card 110, and one or several process control devices 11, 15, 42, rotating equipment (e.g., motors, pumps, compressors, drives), mechanical vessels (e.g., tanks, pipes, etc.), electrical power distribution equipment (e.g., switch gear, motor control centers), or any other plant assets. As mentioned above, a user may connect the UI device 112 to one of the process control devices 11, 15, 42 to monitor, control, configure, troubleshoot, calibrate, or perform any other operations on the connected process control device.

In any event, before the user can perform operations on the connected process control device, the UI device 112 authenticates the user using two-factor authentication and determines whether the user is authorized to access the connected process control device. When the connected process control device is the controller 11, the UI device 112 may also determine whether the user is authorized to access each of the field devices controlled by the controller 11. In some embodiments, the user may not be able to access the controller 11 unless the user can access each of the field devices controlled by the controller 11.

The electronic ID card 110 may be an employee badge with identity information printed on the surface, such as a photograph of the employee, a name of the employee, etc. The electronic ID card 110 may also include an embedded chip which transmits an electronic signal, such as an RFID or NFC signal. The embedded chip may include a tag 114 with identification information for the employee, such as an employee ID number which uniquely identifies the employee within the process plant, an indication of a job function of the employee, a name of the employee or any other suitable information.

Figure 2A:
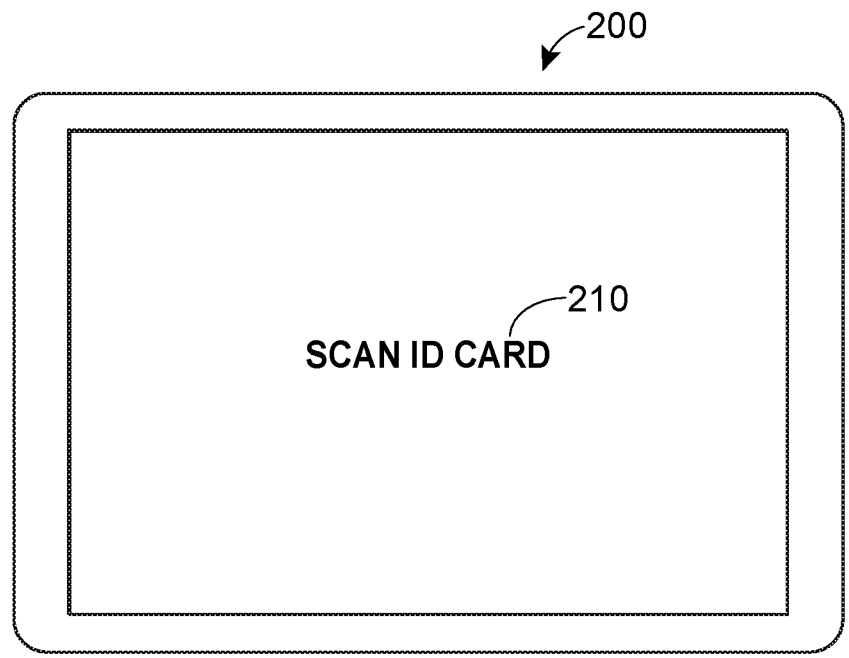
FIGS. 2A-B illustrate example screen displays on the UI device during the two-factor authentication process.

The UI device 112 includes a communication unit for transmitting and receiving electronic data. The communication unit may also include an RFID reader or NFC reader for receiving and decoding RFID or NFC signals. Accordingly, a user may provide a first type of identification information to the UI device 112 by placing her electronic ID card 110 within an RFID or NFC communication range of the UI device 112 (e.g., 1 inch, 3 inches, 6 inches, 1 foot, 3 feet, etc.). FIG. 2A illustrates an example screen display 200 which may be presented on the UI device 112 for scanning an electronic ID card 110. The example screen display 200 may include a request 210 for the user to scan her electronic ID card 110 and an indication of whether the UI device 112 received an RFID tag from the electronic ID card 110. For example, the indication may be a green background color when an RFID tag has been received and a red background color when the RFID tag has not been received. In another example, the indication may be a beep or other sound from the UI device 112 when an RFID tag has been received. Accordingly, when a user places her electronic ID card 110 within communication range of the UI device 112, the RFID tag 114 is transmitted to the UI device 112. The UI device 112 then displays an indication that the RFID tag has been received. In other embodiments, the UI device 112 displays the indication that the RFID tag has been received after the identification information in the RFID tag is authenticated.

In some embodiments, the UI device 112 may store indications of authorized users and user/employee ID numbers for the authorized users. The UI device 112 may compare the user/employee ID included in the received signal to the indications of authorized users to authenticate the user. In other embodiments, the UI device 112 may transmit the user/employee ID to the server 150 for the server 150 to perform the comparison. In any event, if the user/employee ID matches with one of the user/employee IDs in the indications of authorized users, the UI device 112 may display a request to the user for a second type of identification information.

Figure 2B:
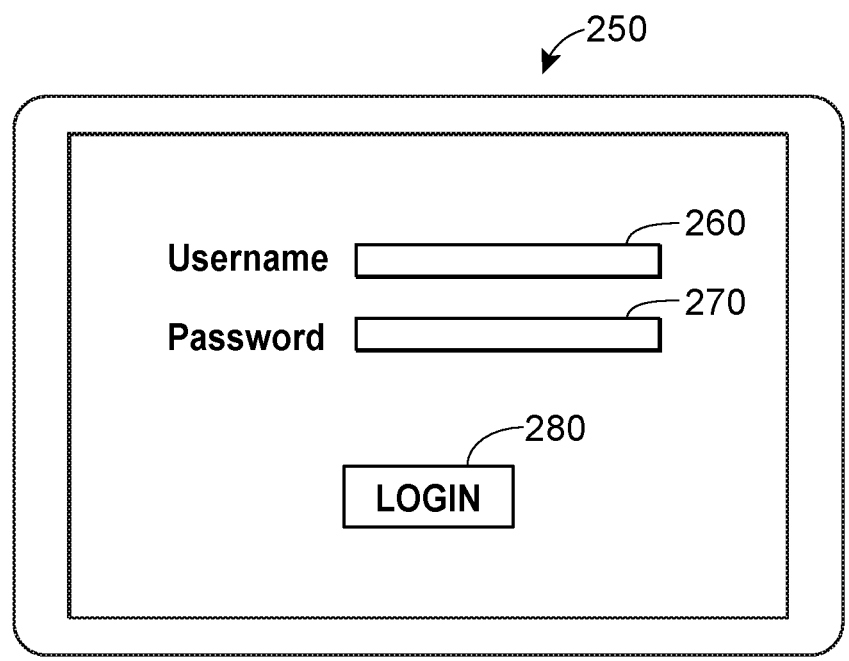

For example, the UI device 112 may request the user to enter user login information, such as a username and password. FIG. 2B illustrates another example screen display 250 for providing user login information. The screen display 250 includes a text field 260 for entering a username, a text field 270 for entering a password, and a "Login" button 280. Accordingly, the user may enter a username and password into the text fields 260, 270 using a software keyboard display on the UI device 112 or hardware keyboard attached to the UI device 112. In other embodiments, the screen display 250 includes a text field for entering a passcode/PIN number. In some embodiments, the UI device 112 may present the screen display 250 after authenticating the user's first type of identification information.

Similar to the first type of identification information, when the user selects the "Login" button 280, the UI device 112 may compare the username and password to stored user login information for authorized users. In other embodiments, the UI device 112 may transmit the username and password to the server 150 for the server 150 to perform the comparison. If the username and password matches with user login information for the same user as the user/employee ID, the UI device 112 may authenticate the user. As a result, the user is provided access to the UI device 112 which may in turn, perform operations on the connected process control device or other plant asset.

While the two types of identification information have been described as an RFID tag and user login information, these are merely exemplary types of identification information. The first type of identification information may be any suitable type of physical or inherent identification information and the second type of identification information may be any suitable type of knowledge-based information provided by the user. Additionally, any suitable types of identification information may be utilized for the first and second types of identification information in the two-factor authentication process.

Figure 1C:
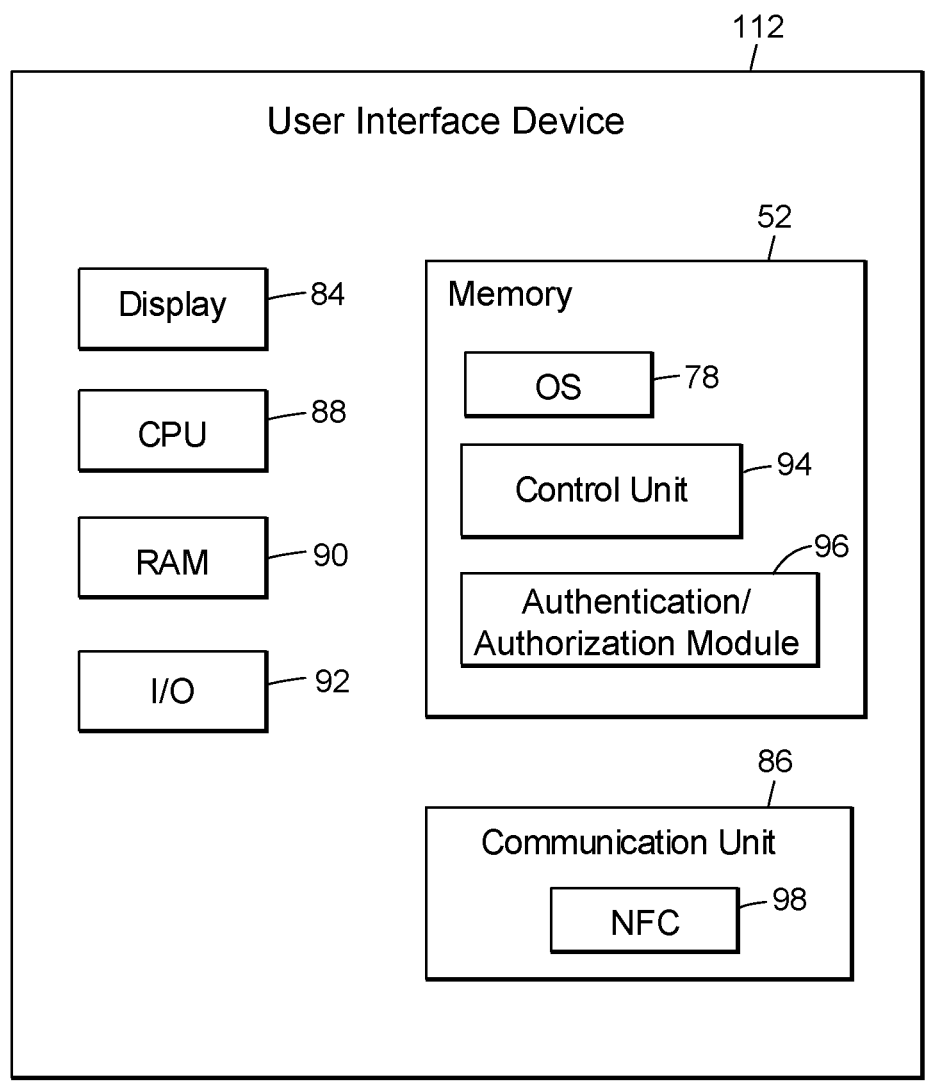
FIG. 1C is a block diagram of an example UI device schematically illustrated in FIG. 1A.

FIG. 1C illustrates a block diagram of an example UI device 112. The UI device 112 may be a handheld device. The UI device 112 may include a display 84, one or more processors or CPUs 88, a memory 52, a random-access memory (RAM) 90, an input/output (I/O) circuit 92, and a communication unit 86 to transmit and receive data via a local area network, wide area network, or any other suitable network. The communication unit 86 may include an NFC or RFID reader 98 to receive and decode NFC or RFID signals. The UI device 112 may communicate with the controllers 11, the server 150, and/or any other suitable computing device. The I/O circuit 92 may include integral communications components, such as an external connector for physically attaching the UI device 112 to the controller 11, field devices 15-22, 40-50, or other plant assets. The external connector may include integral I/O capabilities for communicating with a particular controller 11, field device 15-22, 40-50, or other plant asset. In this manner, the UI device 112 may be integrated with the particular controller 11, field device 15-22, 40-50, or other plant asset which connects to the UI device 112.

The memory 52 may include an operating system 78, a control unit 94 for controlling the display 88 and communicating with process control devices or other plant assets, and an authentication/authorization module 96 for authenticating a user and determining a level of authorization for the user. In some embodiments, the authentication/authorization module 96 may determine whether a user has access to a connected plant asset as well as the types of operations the user is authorized to perform on the connected plant asset. Once it is determined that the user is authorized to execute a particular function to perform an operation on the connected plant asset (e.g., a configuration function), the control unit 94 may control configuration of the connected plant asset by receiving inputs from the user, displaying outputs from the connected plant asset, and communicating with the connected plant asset to adjust settings on the connected plant asset.

Additionally, the UI device 112 may be intrinsically safe such that the UI device 112 can be used in a hazardous area having flammable and/or explosive atmosphere, such as near a particular equipment asset, without having to move out of the hazardous area. Preferably, the UI device 112 meets the standards for intrinsic safety, for example, by conforming to standards of the Factory Mutual Research Corporation, the Canadian Standards Association, the International Electrotechnical Commission, the ATEX Directive, and/or similar safety standards. The UI device 112 may be certified as being intrinsically safe, that is, safe for use in a hazardous area, such as in a Class I, Division 1 area under the ANSI/NEC classification system or a similar area with flammable or explosive atmospheres.

For example, the UI device 112 may include a protective housing suitable for use in both safe and hazardous areas. Moreover, the total amount of energy available in the UI device 112 may be below a threshold sufficient to ignite an explosive atmosphere. The energy can be electrical (e.g., in the form of a spark) or thermal (e.g., in the form of a hot surface). For example, voltage within the UI device 112 may be less than a threshold voltage (e.g., 29 V), current running through the UI device 112 may be less than a threshold current (e.g., 300 mA), and the power associated with any circuit or circuit component in the UI device 112 may be below a threshold wattage (e.g., 1.3 W). The UI device 112 may include one or more built-in redundancies (e.g., automatic shutdown, redundant components, etc.) to ensure that component failure does not result in these energy limitations being exceeded.

To authorize users and UI devices to access process control devices or other plant assets, the server 150 generates permissions which specify a level of access to a particular process control device or other plant asset. For example, a first permission may allow access to Field Device A for reading data from the device and for executing monitoring functions. A second permission may allow access to Field Device B for reading and writing data to the device and for executing calibration and configuration functions. Additionally, the second permission may specify a time duration (e.g., 1 hour) and a plant area in which the user may access the process control device. In some embodiments, a system administrator may interact with the server 150 to generate the permissions.

In addition to generating the permissions, the server 150 may assign each permission to one or several users and to one or several UI devices. For example, the system administrator may grant the first permission to a first subset of users and a first subset of UI devices in the process plant. In some scenarios, each user who is granted the same permission may have a same or similar job function with the process plant. For example, each of the maintenance technicians in a process plant may be assigned the same permissions. In some embodiments, the indications of permissions, users in the process plant, UI devices within the process plant, and associations between the permissions, users, and UI devices may be stored in one or several databases communicatively coupled to the server 150.

FIGS. 3A-3C illustrate example data tables which may be generated by the server 150 and stored in one or several databases. The example data tables are shown for illustrative purposes only, and the associated functionality may be implemented using any suitable format and/or design for generating, storing, and retrieving permissions, users, UI devices, and associations between the permissions, users, and UI devices. Accordingly, the permissions and associations between the permissions, users, and UI devices may be generated, stored, and retrieved in any suitable manner. Moreover, while each data table includes a few entries, this is merely for ease of illustration. Each data table may include tens, hundreds, thousands, or any suitable number of data entries.

FIG. 3A illustrates an example permissions data table 300 which includes indications of several permissions. Each permission may include a permission ID 302 which uniquely identifies the permission. Each permission may also include a unique identifier for a plant asset 304 which may be accessed via the permission (e.g., Field Device A, Field Device B) and a type of access for the permission 306 (e.g., read-only, read/write). Additionally, the permissions may include an area of the plant in which the access is permitted 308 (e.g., Plant Area A, Plant Area B). The area may be a particular room within the process plant, may be determined using a threshold radius around the location of a particular plant asset, may be a building within the process plant, or may be any other suitable area. In this manner, a user may access a particular plant asset only when the user is proximate to the plant asset. Some permissions may indicate that access is permitted for all areas. In some embodiments, the permission may not include a unique identifier for a plant asset 304 which may be accessed via the permission, and instead the permission may grant access to all plant assets within the plant area 308.

Furthermore, the permissions may include functions 310 which the user is allowed to execute to perform operations on the corresponding plant asset (e.g., configure, calibrate, troubleshoot, monitor, control). In some embodiments, the functions may be based on the type of access included in the permission 306. For example, if the permission includes read-only access, the user may not be able to execute a configuration function which requires writing to the plant asset. The functions may be software applications on a UI device 112 controlled by the user or may be capabilities of a software application. For example, the permissions may specify which software applications the user may access on the UI device 112 when the UI device 112 is connected to a particular plant asset. The permissions may also specify which capabilities are accessible to the user using a particular software application. Some permissions may indicate that access is permitted for all functions.

Moreover, each permission may include a time duration 312 in which a corresponding plant asset may be accessed. The time duration can be infinite or may include a threshold time for the access (e.g., 30 minutes, 1 hour, 3 hours, etc.). In this manner, a user may have access to a plant asset for a threshold duration, and when the time expires the user may no longer be able to interact with the plant asset.

While the example permissions data table 300 includes permission ID 302, device 304, access types 306, plant area 308, functions 310, and duration 312 data fields, additional, fewer, or alternative data fields may be included with each permission. In some embodiments, the permissions may be generated by a system administrator via a user interface on the server 150.

In addition to the generating the permissions, the server 150 may assign the permissions to users and UI devices in the process plant. A user who is assigned a permission may be granted access to the plant asset or group of plant assets within the plant area included in the permission when using a UI device. In some embodiments, the UI device may also need to be granted access to the plant asset for the user to access the plant asset when using the UI device. In other embodiments, when one of the user and the UI device is granted permission to access the plant asset, the user may access the plant asset via the UI device.

In any event, FIG. 3B illustrates an example users data table 330 which includes indications of several users who work in the process plant. The users data table 300 may be used to generate user profiles for each of the users. Each user may have a user ID 332 which uniquely identifies the user (e.g., 0001, 0002, 0003, XXY, AAC, etc.). Each user may also have an associated job function 334 within the process plant (e.g., configuration engineer, maintenance technician, etc.).

A group of users may also be assigned to a security group 336, where each of the members of a security group may be assigned the same permissions. For example, a first security group may include permissions 1-4. When a user is assigned to the first security group, the user is also automatically assigned each of permissions 1-4. In this manner, a system administrator does not have to individually assign a same set of permissions to several users.

The system administrator may assign permissions to a security group via a user interface on the server 150. For example, the system administrator may view indications of permissions previously assigned to the security group and enter in an identifier for a new permission to assign to the security group (e.g., a permission ID), select the permission from several permissions in a drop-down menu, or assign the permission to the security group in any other suitable manner.

In some embodiments, members of a security group may include users who share a common attribute within the process plant, such as a same job function or role within the process plant. For example, a first security group may be for configuration engineers, a second security group may be for maintenance technicians, a third security group may be for plant operators, etc. Additionally, users may be assigned to multiple security groups or may be provided with temporary access to various security groups. For example, when a user is required to perform an additional job function outside of her normal job function temporarily, the user may be assigned to another security group for the additional job function while the user is also assigned to the security group for her normal job function.

In some embodiments, a user is automatically assigned to a security group based on the user's job function. In other embodiments, the system administrator assigns the user to a security group via a user interface on the server 150. For example, the system administrator may view a user profile for the user and enter in an identifier for the security group, select the security group from several security groups in a drop-down menu, or assign the user to a security group in any other suitable manner.

The users data table 330 may also include indications of permissions 338 assigned to each user. In some embodiments, the permissions assigned to a user may correspond to the permissions assigned to the user's security groups. When a user does not belong to a security group or in addition to the permissions assigned to the security groups, the indications of permissions may also include permissions individually assigned to the user.

The system administrator may assign permissions to a user via a user interface on the server 150. For example, the system administrator may view a user profile for the user and enter in an identifier for the permission (e.g., a permission ID), select the permission from several permissions in a drop-down menu, or assign the permission to the user in any other suitable manner.

While the example users data table 330 includes user ID 332, job function 334, security group 336, and permissions 338 data fields, additional, fewer, or alternative data fields may be included for each user. For example, the users data table 330 may also include a name data field, a date of birth data field, a home address data field, a work start date data field, username and password data fields, etc.

FIG. 3C illustrates an example UI devices data table 360 which includes indications of UI devices within the process plant. Each UI device may have a UI device ID 362 which uniquely identifies the UI device (e.g., UI01, UI02, UI03, XXX, BBZ, etc.). The UI device data table 360 may also include indications of permissions 364 assigned to each UI device.

The system administrator may assign permissions to a UI device via a user interface on the server 150. For example, the system administrator may view a profile for the UI device and enter in an identifier for the permission (e.g., a permission ID), select the permission from several of permissions in a drop-down menu, or assign the permission to the UI device in any other suitable manner.

In addition to the permissions assigned to the UI devices, each UI device may have licensed functions 366 or licensed software. For example, the process plant may obtain a license for a software application on one UI device without obtaining the license on other UI devices. Accordingly, even if the UI device is granted permission to execute a certain function by the system administrator according to the permissions assigned to the UI device, the UI device may not be able to execute the function if the function is not licensed on the UI device. For example, UI device UI01 is assigned permission 1 which grants UI device UI01 permission to execute calibration functions on Field Device A. However, according to the licensed functions 366 for UI device UI01, UI device UI01 is not licensed to execute calibration functions (e.g., the calibration software is not licensed on UI device UI01). Therefore, UI device UI01 will not run the calibration software to calibrate Field Device A.

While the example UI devices data table 360 includes UI device ID 362, permissions 364, and licensed functions 366 data fields, additional, fewer, or alternative data fields may be included for each UI device. For example, the UI devices data table 360 may also include a location data field indicating the location within the process plant in which the UI device is stored when not in use. Additionally, the UI devices data table 360 may include a make and model of the UI device, system information for the UI device, etc. Furthermore, the UI devices data table 360 may include indications of the hardware/software modules on the UI device, for determining whether the UI device includes the appropriate hardware/software for executing a particular function, such as one of the licensed functions 366.

In some embodiments, the server 150 may transmit data from each of the data tables 300, 330, 360 as shown in FIGS. 3A-3C to the UI devices in the process plant. When a user attempts to access one of UI devices, the UI device performs two-factor authentication of the user as described above. If the user is authenticated, the UI device may determine a level of authorization for the user using the transmitted data. Also in some embodiments, the server 150 may transmit data corresponding to the user from the users data table 330 to the user's electronic ID card. In this manner, the RFID tag within the electronic ID card may include the set of permissions which are assigned to the user.

For example, when the UI device is connected to a process control device or other plant asset, the UI device may receive an identifier, such as a device ID which uniquely identifies the process control device or other plant asset (e.g., Field Device A, Field Device B, etc.). In some embodiments, the UI device may obtain a user ID for the user during the two-factor authentication process (e.g., via the RFID tag or the username and password). The UI device may also store its UI device ID in memory. Then, the UI device may retrieve a set of permissions for the user and for the UI device from the users data table 330 and the UI device data table 360, respectively, using the obtained user ID and UI device ID. In other embodiments, the server 150 may receive a user ID and UI device ID from the UI device, and transmit a set of permissions which are assigned to the user and/or UI device. In yet other embodiments, the RFID tag may include the set of permissions for the user. When the UI device obtains a user ID for the user via the RFID tag during the two-factor authentication process, the RFID tag may also transmit the set of permissions for the user.

In any event, the UI device may identify the permissions that are assigned to the user and/or the UI device and which specify a level of access to the process control device or other plant asset connected to the UI device. If none of the permissions specify a level of access to the connected plant asset, the UI device determines that the user does not have access to the connected plant asset. Accordingly, the UI device does not allow the user to communicate with the connected plant asset. In some embodiments, the UI device may display a message via the user interface indicating that the user is denied access to the connected plant asset. The message may provide an explanation as to why the user is denied access (e.g., the user does not have permission to access the plant asset, the UI device does not have permission to access the plant asset, or both the user and the UI device do not have permission to access the plant asset). The message may also provide instructions for gaining access to the plant asset, such as instructions to retrieve a UI device which has permission to access the plant asset, or instructions for contacting the system administrator.

On the other hand, if one or more permissions specify a level of access to the connected plant asset, the UI device determines the type of access that the user and/or UI device have and the functions the user and/or UI device are allowed to perform. The UI device may also identify an area in which the user has access to the connected plant asset. In some embodiments, the UI device may determine its location via a positioning sensor, such as a global positioning system (GPS). In other embodiments, the server 150 may store indications of the locations of each plant asset. The UI device may obtain the location of the connected plant asset from the server 150 or may obtain indications of the locations of each plant asset for determining the location of the connected plant asset. The UI device may determine its location as the location of the connected plant asset. The UI device may then determine whether the location is within the area in which the user has access to the connected plant asset. Further, the UI device identifies a time duration for the access and may periodically compare the difference between the current time and the start time of the access to the time duration.

When a user attempts to execute a particular function (e.g., a software application or capability of a software application) on the UI device to perform an operation on the connected plant asset, the UI device determines whether the user is permitted to access the function. Additionally, the UI device determines whether the function is licensed on the UI device. Moreover, the UI device determines whether the UI device includes the appropriate hardware/software for executing the function and/or whether the connected plant asset includes the appropriate hardware/software for performing an operation corresponding to the executed function. For example, when the UI device connects to a process control device, the UI device may receive indications of the hardware/software modules on the process control device for determining whether the process control device includes the appropriate hardware/software for performing a particular operation.

If the user is permitted to access the function, the function is licensed on the UI device, and the UI device/connected plant asset have the appropriate hardware/software for executing the function and performing the operation corresponding to the executed function, the UI device may execute the function to perform the operation on the connected plant asset. On the other hand, if the user is not permitted to access the function when interacting with the connected plant asset, the function is not licensed on the UI device, or the UI device/connected plant asset do not have the appropriate hardware/software for executing the function and performing the operation, the UI device may display a message indicating that the user does not have access to the function. In other embodiments, when a user attempts to execute a particular function on the UI device, the UI device may transmit an indication of the function to the server 150. The server 150 may then determine whether the user has access to the function by retrieving permissions based on the user ID for the user, UI device ID for the user device, and/or device ID for the connected plant asset. In turn, the UI device may receive an indication from the server 150 which states that access is permitted or denied.

In some embodiments, when a user is denied access to a connected plant asset or to a function executed on the UI device, the UI device may transmit a notification to the server 150 indicating that an unauthorized user attempted to access a particular plant asset or function. The notification may be displayed on the user interface of the server 150 for review by a system administrator. Additionally, the notification may include information pertaining to the unauthorized use, such as a user ID for the unauthorized user, a UI device ID for the UI device, a device ID for the connected plant asset, an indication of the selected function, an indication of the location of the UI device, etc. The notification may also include an indication of the reason for denying access (e.g., the user attempted to access a plant asset which he is not permitted to access, the user attempted to access the plant asset outside of the permitted area, the user attempted to access the plant asset for longer than the authorized duration, etc.).

The system administrator may review the notification and determine that for example, several users attempted to access the same process control device outside of the permitted area. As a result, the system administrator may determine that the permitted area needs to be adjusted or that the users need to be informed of which areas access is permitted and which areas access is denied. The system administrator may also review the notification and assign a new permission to the user so that the user may access a particular process control device or a particular function when interacting with the process control device. When the permissions are updated or the users and/or UI devices assigned to each permission changes, the server 150 may transmit an updated permissions list to the UI devices.

Figure 4:
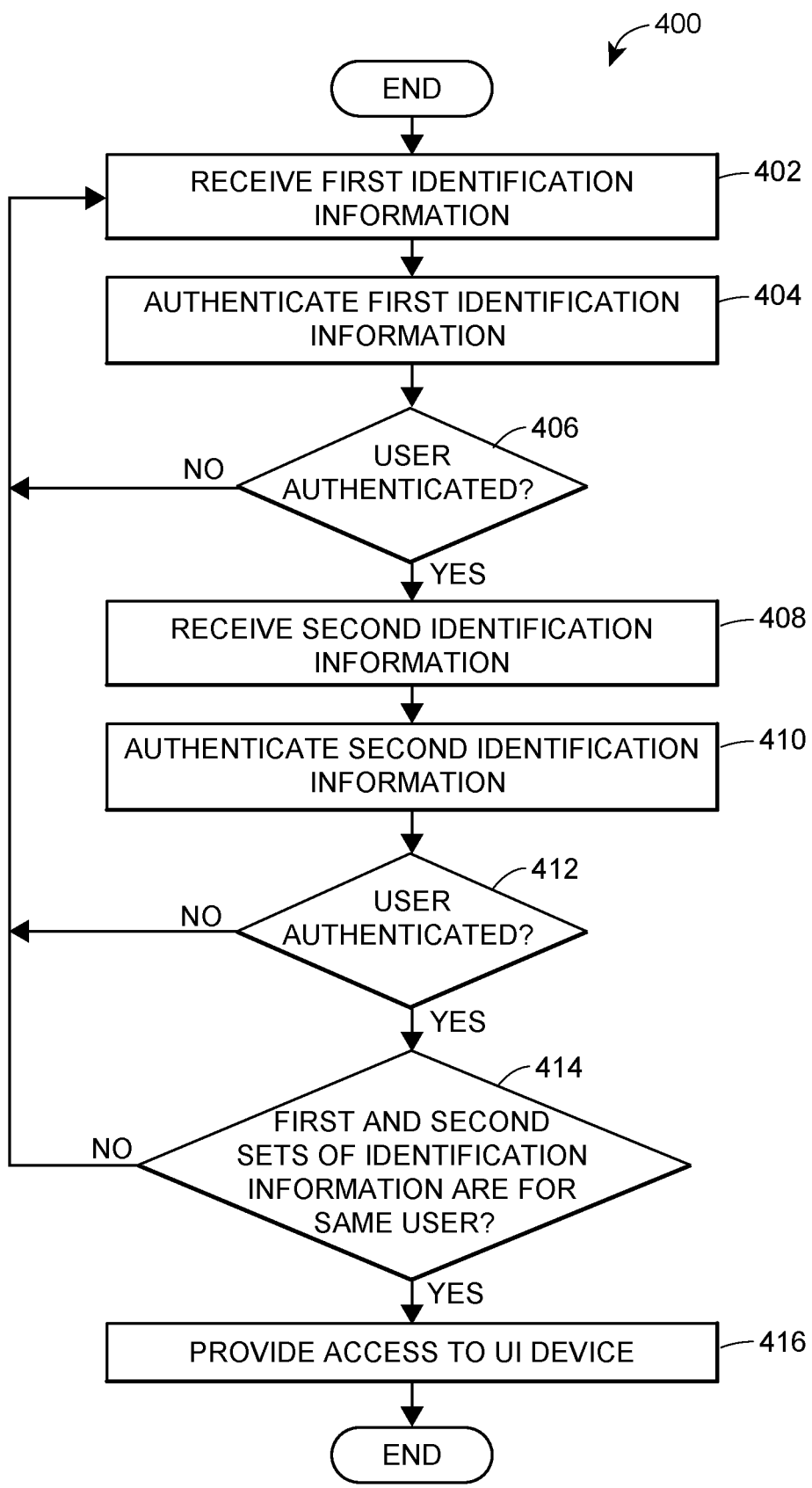
FIG. 4 is a flow diagram representing an exemplary method for performing two-factor authentication on a UI device.

FIG. 4 depicts a flow diagram representing an exemplary method 400 for performing two-factor authentication in a process plant. The method 400 may be executed on the UI device 112. In some embodiments, the method 400 may be implemented in a set of instructions stored on a non-transitory computer-readable memory and executable by one or more processors of the UI device 112. For example, the method 400 may be performed by the authentication/authorization module 96 as shown in FIG. 1C.

At block 402, the UI device 112 receives a first type of identification information for a user. The first type of identification information may be provided from an identification device or may be a physical trait of the user. For example, the UI device 112 may present the display screen 200 as shown in FIG. 2A, which includes a request 210 for the user to scan her electronic ID card. The user may then place her electronic ID card within communication range of the UI device 112 (e.g., 1 inch, 3 inches, 6 inches, 1 foot, 3 feet, etc.), which establishes a short-range communication link between the electronic ID card and the UI device 112. The electronic ID card then transmits an RFID tag to the UI device 112 which includes identification information for the user, such as a user ID. However, this is merely one exemplary type of identification information which may be provided to the UI device 112. Additional or alternative types of identification information may also be provided, such as a social security card, a driver's license, biometric information including a fingerprint or retinal image, etc.

In any event, the UI device 112 may authenticate the first type of identification information for the user (block 404). For example, the UI device 112 may store user profiles for each authorized user within the process plant. The user profiles may include a user ID, username, password, passcode/PIN number, and any other suitable information related to the authorized user. More specifically, the user profiles may be generated based on data from the users data table 330 as shown in FIG. 3B. The UI device 112 may then compare the first type of identification information for the user (e.g., a user ID in an RFID tag) to the user profiles or users data table 330 to determine whether the first type of identification information corresponds to an authorized user within the process plant (block 406). In another example, the UI device 112 may transmit the first type of identification information to the server 150, and the server 150 may compare the first type of identification information to user profiles or the users data table 330.

In any event, if the first type of identification information does not correspond to an authorized user within the process plant, the UI device 112 does not authenticate the user and may ask for the user to provide another type of identification information or to try scanning the ID card again. On the other hand, if the first type of identification information corresponds to a user within the process plant, the UI device 112 receives a second type of identification information for the user (block 408). The second type of identification information may be information provided by the user. For example, the UI device 112 may present the display screen 250 as shown in FIG. 2B, which includes user controls 260, 270 for the user to enter user login information, such as a username and password. However, this is merely one exemplary type of identification information which may be provided to the UI device 112. Additional or alternative types of identification information may also be provided by the user, such as a user ID, an email address, a date of birth, a passcode/PIN number, etc.

In any event, the UI device 112 may authenticate the second type of identification information for the user (block 410). For example, the UI device 112 may compare the second type of identification information for the user (e.g., a username and password) to the user profiles or users data table 330 to determine whether the second type of identification information corresponds to an authorized user within the process plant (block 412). In another example, the UI device 112 may transmit the second type of identification information to the server 150, and the server 150 may compare the second type of identification information to user profiles or the users data table 330.

If the second type of identification information does not correspond to an authorized user within the process plant, the UI device 112 does not authenticate the user and may ask for the user to provide another type of identification information or to try entering a username and password again. Additionally, the UI device 112 determines whether the first and second types of identification information correspond to the same authorized user within the process plant (block 414). If the first and second types of identification information do not correspond to the same authorized user, the UI device 112 does not authenticate the user and may ask for the user to provide the first and second types of identification information again. On the other hand, if the first and second types of identification information correspond to the same authorized user, the user is provided access to the UI device 112 (block 416). Accordingly, the user may execute functions on the UI device 112. The functions may perform operations on a process control device or other plant asset connected to the UI device 112, such as functions which monitor, control, calibrate, configure, or troubleshoot the connected process control device or other plant asset.

While the method 400 includes steps for authenticating each type of identification information as it is received, both the first and second types of identification information may be received before being authenticated. For example, the UI device 112 may receive an RFID tag and a username and password from the user, and then compare a user ID from the RFID tag and the username and password to user profiles for authorized users within the process plant. Additionally, the method 400 may include steps to avoid searching through each of the user profiles a second time to find an authorized user who matches with the second type of identification information. For example, after identifying an authenticated user who matches with the first type of identification information, the UI device 112 may compare user data for the authenticated user to the second type of identification information.

As mentioned above, after a user is authenticated via the two-factor authentication process, the UI device 112 determines a level of authorization that the user has to a process control device or other plant asset which is connected to the UI device 112. For example, the user may connect the UI device 112 to a valve to monitor, control, configure, calibrate, troubleshoot, or perform any other suitable operation on the valve.

Figure 5:
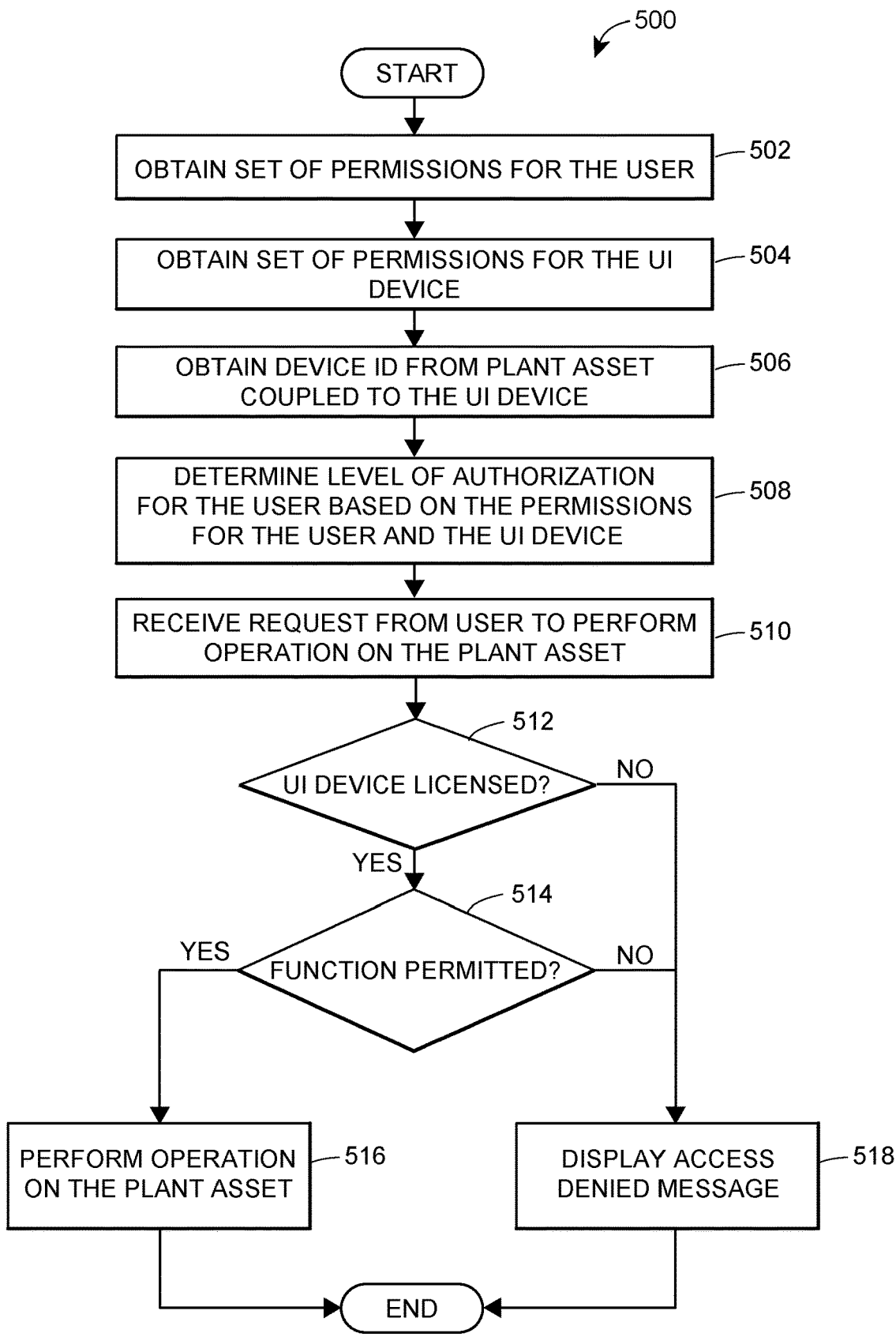
FIG. 5 is a flow diagram representing an exemplary method for determining a level of authorization that the user has to access a particular plant asset.

FIG. 5 depicts a flow diagram representing an exemplary method 500 for determining a level of authorization that the user has to a connected plant asset. The method 500 may be executed on the UI device 112. In some embodiments, the method 500 may be implemented in a set of instructions stored on a non-transitory computer-readable memory and executable by one or more processors of the UI device 112. For example, the method 500 may be performed by the authentication/authorization module 96 as shown in FIG. 1C.

At blocks 502 and 504, the UI device 112 may obtain a set of permissions for the user and the UI device 112, respectively. For example, the UI device 112 may obtain the permissions data table 300, the users data table 330, and the UI devices data table 360 as shown in FIGS. 3A-C, respectively, from the server 150. The UI device 112 may also obtain an identifier from a process control device or other plant asset which is connected to the UI device 112 (block 506). For example, the process control device or other plant asset may transmit a device ID to the UI device 112. The UI device 112 may also obtain an identifier for the user from the two-factor authentication process, such as a user ID, and may obtain an identifier for the UI device 112, such as a UI device ID.

Then, the UI device 112 may obtain the set of permissions for the user and the UI device using the user ID and UI device ID. For example, the permissions may be obtained from the users data table 330 and the UI devices data table 360. The UI device 112 may then identify the permissions which specify a level of access to the connected plant asset using the device ID. In other embodiments, the UI device 112 may transmit the user ID, UI device ID, and device ID for the connected plant asset to the server 150 and may receive a set of permissions assigned to the user and UI device 112 from the server 150. In yet other embodiments, an RFID tag may include the set of permissions for the user. When the UI device 112 obtains an identifier for the user via the RFID tag during the two-factor authentication process, the RFID tag may also transmit the set of permissions for the user.

Based on the permissions which specify a level of access to the connected plant asset, the UI device 112 may determine a level of authorization for the user (block 508). For example, the user and/or UI device 112 may not be assigned any permissions which specify a level of access to the connected plant asset. Accordingly, the UI device 112 may display a message to the user indicating that access to the connected plant asset is denied. The message may also include an explanation for denying access (e.g., the UI device 112 does not have permission to access the connected plant asset, the user does not have permission to access the connected plant asset, neither the UI device 112 nor the user have permission to access the connected plant asset, etc.).

The level of authorization for the user may include the type of access the user has to the connected plant asset (e.g., read-only, read/write, etc.) and the functions that the user can access to perform operations on the connected plant asset (e.g., configure, troubleshoot, calibrate, monitor, control, etc.). The level of authorization may also include an area of the process plant in which the user has access to the connected plant asset and a time duration for the user to access the connected plant asset.

At block 510, the user may direct the UI device 112 to perform an operation on the connected plant asset. The UI device 112 may then determine, based on the level of authorization for the user, whether the user has access to the function which performs the requested operation on the connected plant asset (block 512). For example, the UI device 112 may determine its location via GPS or any other suitable positioning device. In another example, the server 150 may store indications of the locations of each plant asset. The UI device may obtain the location of the connected plant asset from the server 150 or may obtain indications of the locations of each plant asset for determining the location of the connected plant asset. The UI device may determine its location as the location of the connected plant asset. The UI device 112 may then determine whether the location is within the area in which the user has access to the connected plant asset. Additionally, the type of access and functions for the level of authorization may be compared to the function which performs the requested operation. The UI device 112 may also determine whether the time duration for the authorization has expired. In some embodiments, the UI device 112 may determine whether the function which performs the requested operation is licensed on the UI device 112 (block 512). Also in some embodiments, the UI device 112 may determine whether the UI device/connected plant asset have the appropriate hardware/software for executing the function and performing the operation corresponding to the executed function.

If the function is permitted based on the user's level of authorization, the UI device 112 is licensed to execute the function, and the UI device/connected plant asset have the appropriate hardware/software for executing the function and performing the operation corresponding to the executed function, the UI device 112 may perform the corresponding operation on the process control device or other plant asset (block 516). For example, the UI device 112 may request that the process control device obtains and transmits a measurement to be displayed on the UI device 112. If the function is not permitted based on the user's level of authorization (e.g., the user is outside of the permitted area, the time duration for the authorization has expired, the user is not permitted to the execute the function when communicating with the connected plant asset, etc.), the UI device 112 is not licensed to execute the function, or the UI device/connected plant asset do not have the appropriate hardware/software for executing the function and performing the operation corresponding to the executed function, the UI device 112 will not execute the function. Additionally, a message may be displayed to the user indicating that access to the connected plant asset is denied (block 518). The message may also include an explanation for denying access.

Figure 6:
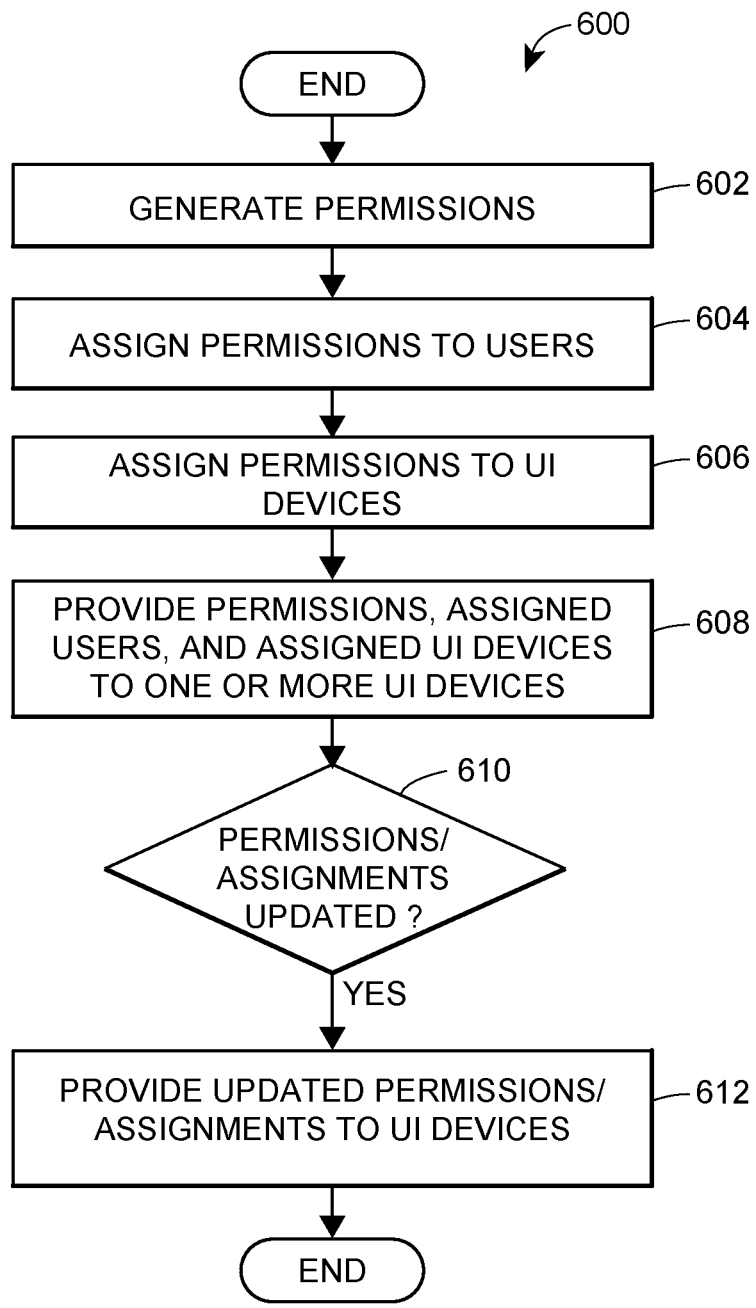
FIG. 6 is a flow diagram representing an exemplary method for generating a set of permissions and assigning the permissions to users and UI devices.

FIG. 6 depicts a flow diagram representing an exemplary method 600 for generating a set of permissions and assigning the permissions to users and UI devices within the process plant. The method 600 may be executed on the server 150. In some embodiments, the method 600 may be implemented in a set of instructions stored on a non-transitory computer-readable memory and executable by one or more processors of the server 150.

At block 602, the server 150 generates several permissions, where each permission specifies a level of access to a particular process control device or other plant asset or a group of process control devices or other plant assets within a particular plant area. For example, a permission may include an identifier for a process control device, such as a device ID. The permission may also include types of access to the process control device or other plant asset, such as read-only, read/write, etc. Additionally, the permission may include functions that perform operations on the process control device or other plant asset. Moreover, the permission may include a plant area in which access to the process control device or other plant asset is permitted and a time duration for accessing the process control device or other plant asset. In some embodiments, a system administrator may interact with the server 150 to generate the permissions.

In addition to generating the permissions, the server 150 may assign each permission to one or several users (block 604) and to one or several UI devices (block 606) within the process plant. The system administrator may assign permissions to a user via a user interface on the server 150. For example, the system administrator may view a user profile for the user and enter in an identifier for the permission (e.g., a permission ID), select the permission from several permissions in a drop-down menu, or assign the permission to the user in any other suitable manner. The system administrator may also assign permissions to a UI device via a user interface on the server 150. For example, the system administrator may view a profile for the UI device and enter in an identifier for the permission (e.g., a permission ID), select the permission from several permissions in a drop-down menu, or assign the permission to the UI device in any other suitable manner.

In some embodiments, the server 150 may also assign permissions to security groups which include several users. When a permission is assigned to a security group, each of the users who belong to the security group are granted the permission. The system administrator may assign permissions to security groups by viewing indications of security groups via a user interface on the server 150. The system administrator may enter in an identifier for the permission (e.g., a permission ID), select the permission from several permissions in a drop-down menu, or assign the permission to the security group in any other suitable manner.

At block 608, the server 150 may provide the permissions along with indications of each user and UI device assigned to a permission to one or several UI devices within the process plant. In some embodiments, the server 150 may provide the permissions to each of the UI devices in the process plant. Also in some embodiments, the server 150 may provide the permissions corresponding to a particular user (e.g., via the users data table) to an electronic ID card which belongs to the particular user. In other embodiments, the server 150 may provide the permissions when a user attempts to access a UI device or when the UI device is connected to a process control device or other plant asset. For example, when a user attempts to access a UI device and connects the UI device to a process control device, the UI device may transmit a user ID for the user, a UI device ID for the UI device, and/or a device ID for the connected process control device to the server 150. The server 150 may then obtain a set of permissions which correspond to the user, UI device, and/or connected process control device and transmit the set of permissions to the UI device.

At block 610, the server 150 determines whether there have been any updates to the permissions and/or to the users and UI devices assigned to the permissions. For example, the server 150 may determine whether the system administrator added additional permissions, removed permissions, assigned another permission to a user or UI device, removed a permission from a user's assigned permissions, assigned permissions to a new user or UI device, etc.

If the permissions or assignments have been updated, the server 150 may provide an updated permissions list to one or several UI devices within the process plant (block 612). In some embodiments, the server 150 may provide the updated permission list to each of the UI devices in the process plant. In other embodiments, the server 150 may provide the updated permissions list when a user attempts to access a UI device or when the UI device is connected to a process control device or other plant asset.

In some embodiments, when a user is denied access to a connected plant asset or to a function executed on the UI device, the server 150 may receive a notification from the UI device indicating that an unauthorized user attempted to access a particular plant asset or function. The notification may be displayed on the user interface of the server 150 for review by a system administrator. Additionally, the notification may include information pertaining to the unauthorized use, such as a user ID for the unauthorized user, a UI device ID for the UI device, a device ID for the connected plant asset, an indication of the selected function, an indication of the location of the UI device, etc. The notification may also include an indication of the reason for denying access (e.g., the user attempted to access a process control device that she is not permitted to access).

The system administrator may review the notification and determine that for example, several users attempted to access the same process control device outside of the permitted area. As a result, the system administrator may determine that the permitted area needs to be adjusted or that the users need to be informed of which areas access is permitted and which areas access is denied. The system administrator may also review the notification and assign a permission to the user so that the user may access a particular plant asset, or a particular function when interacting with the plant asset.

Embodiments of the techniques described in the present disclosure may include any number of the following aspects, either alone or combination:

1. A method for providing two-factor authentication in a user interface device within a process plant, the method comprising: receiving, at one or more processors in a user interface device, a first type of identification information for a user, wherein the user interface device includes integral input/output capabilities for connecting to a plant asset within a process plant; receiving, at the one or more processors, a second type of identification information for the user; comparing, by the one or more processors, each of the first and second types of identification information for the user to a plurality of types of identification information for a plurality of users who are authorized to access the user interface device; and providing, by the one or more processors, authorized access to the user when each of the first and seconds types of identification information correspond to a same authorized user; wherein when the user has authorized access to the user interface device and the user interface device is connected to the plant asset, the user interface device is configured to communicate with the connected plant asset within the process plant.

2. The method according to aspect 1, wherein the first type of identification information is from an identification device or a physical trait of the user and the second type of identification information is knowledge-based identification information provided by the user.

3. The method according to any one of the preceding aspects, wherein: the first type of identification information is received, via a short-range communication link, from an electronic identification card; and the second type of identification information is user login information entered via the user interface device by the user.

4. The method according to any one of the preceding aspects, further comprising: displaying, by the one or more processors, a user login screen including one or more user controls for entering the user login information.

5. The method according to any one of the preceding aspects, further comprising: determining, by the one or more processors, a level of authorization for the user, wherein the level of authorization includes a set of permissions assigned to the user, including one or more plant assets the user is authorized to access or one or more functions that the user is authorized to execute on the user interface device; and determining, by the one or more processors, whether the user is authorized to access the connected plant asset based on the level of authorization for the user.

6. The method according to any one of the preceding aspects, wherein determining a level of authorization for the user includes: obtaining, at the one or more processors, a set of permissions assigned to each of the plurality of users authorized to access the user interface device; and identifying, by the one or more processors, the set of permissions assigned to the user.

7. The method according to any one of the preceding aspects, wherein the level of authorization for the user further includes a time duration in which the user is authorized to access the one or more plant assets or the one or more functions on the user interface device.

8. The method according to any one of the preceding aspects, further comprising: obtaining, by the one or more processors, a set of permissions assigned to the user interface device; and determining, by the one or more processors, whether the user interface device is authorized to access the connected plant asset based on the set of permissions assigned to the user interface device.

9. The method according to any one of the preceding aspects, wherein when the user and the user interface device are authorized to access the connected plant asset, executing, by the one or more processors, a function to perform an operation on the connected plant asset.

10. The method according to any one of the preceding aspects, further comprising: determining, by the one or more processors, whether the user interface device is licensed to execute the function.

11. A user interface device for providing two-factor authentication within a process plant, the user interface device including: one or more processors; an integral input/output component for connecting to a plant asset within a process plant; and a non-transitory computer-readable medium coupled to the one or more processors and the integral input/output component and storing instructions thereon, that when executed by the one or more processors, cause the user interface device to: receive a first type of identification information for a user; receive a second type of identification information for the user; compare each of the first and second types of identification information for the user to a plurality of types of identification information for a plurality of users who are authorized to access the user interface device; and provide authorized access to the user when each of the first and seconds types of identification information correspond to a same authorized user; wherein when the user has authorized access to the user interface device and the user interface device is connected to the plant asset, the user interface device is configured to communicate with the connected plant asset within the process plant via the integral input/output component.

12. The user interface device according to aspect 11, wherein the first type of identification information is from an identification device or a physical trait of the user and the second type of identification information is knowledge-based identification information provided by the user.

13. The user interface device according to either one of aspect 11 or of aspect 12, further comprising a wireless radio, wherein the first type of identification information is received, via a short-range communication link at the wireless radio, from an electronic identification card and the second type of identification information is user login information entered via the user interface device by the user.

14. The user interface device according to any one of aspects 11-13, further comprising a user interface, wherein the instructions further cause the user interface device to: display, on the user interface, a user login screen including one or more user controls for entering the user login information.

15. The user interface device according to any of aspects 11-14, wherein the instructions further cause the user interface device to: determine a level of authorization for the user, wherein the level of authorization includes a set of permissions assigned to the user, including one or more plant assets the user is authorized to access or one or more functions that the user is authorized to execute on the user interface device; and determine whether the user is authorized to access the connected plant asset based on the level of authorization for the user.

16. The user interface device according to any of aspects 11-15, wherein to determine a level of authorization for the user, the instructions cause the user interface device to: obtain a set of permissions assigned to each of the plurality of users authorized to access the user interface device; and identify the set of permissions assigned to the user.

17. The user interface device according to any of aspects 11-16, wherein the level of authorization for the user further includes a time duration in which the user is authorized to access the one or more devices or the one or more functions on the user interface device.

18. The user interface device according to any of aspects 11-17, wherein the instructions further cause the user interface device to: obtain a set of permissions assigned to the user interface device; and determine whether the user interface device is authorized to access the connected plant asset based on the set of permissions assigned to the user interface device.

19. The user interface device according to any of aspects 11-18, wherein when the user and the user interface device are authorized to access the connected plant asset, the instructions cause the user interface device to execute a function to perform an operation on the connected plant asset.

20. The user interface device according to any of aspects 11-19, wherein the instructions further cause the user interface device to: determine whether the user interface device is licensed to execute the function.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device), such as illustrated in FIG. 1C. The instructions, when executed by one or more processors of a corresponding device (e.g., a server, a UI device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A method for providing two-factor authentication in a user interface device within a process plant, the method comprising:
   receiving, at one or more processors in a user interface device, a first type of identification information for a user via a short-range communication link from an electronic identification card, wherein the user interface device includes integral input/output capabilities for connecting to a plant asset within a process plant, and wherein the user interface device is configured for intrinsically safe operation and an electrical characteristic of the user interface device is below an electrical threshold related to an intrinsic safety level;

receiving, at the one or more processors, a second type of identification information for the user including user login information entered via the user interface device by the user;

comparing, by the one or more processors, each of the first and second types of identification information for the user to a plurality of types of identification information for a plurality of users who are authorized to access the user interface device; and providing, by the one or more processors, authorized access to the user when each of the first and second types of identification information correspond to a same authorized user;

wherein when the user has authorized access to the user interface device and the user interface device is connected to the plant asset, the user interface device is configured to communicate with the connected plant asset within the process plant to monitor, configure, troubleshoot, calibrate, or control the connected plant asset.

2. The method of claim 1, further comprising:
displaying, by the one or more processors, a user login screen including one or more user controls for entering the user login information.

3. The method of claim 1, further comprising:
determining, by the one or more processors, a level of authorization for the user, wherein the level of authorization includes a set of permissions assigned to the user, including one or more plant assets the user is authorized to access or one or more functions that the user is authorized to execute on the user interface device; and
determining, by the one or more processors, whether the user is authorized to access the connected plant asset based on the level of authorization for the user.

4. The method of claim 3, wherein determining a level of authorization for the user includes:
obtaining, at the one or more processors, a set of permissions assigned to each of the plurality of users authorized to access the user interface device; and
identifying, by the one or more processors, the set of permissions assigned to the user.

5. The method of claim 4, further comprising:
obtaining, by the one or more processors, a set of permissions assigned to the user interface device; and
determining, by the one or more processors, whether the user interface device is authorized to access the connected plant asset based on the set of permissions assigned to the user interface device.

6. The method of claim 5, wherein when the user and the user interface device are authorized to access the connected plant asset, executing, by the one or more processors, a function to perform an operation on the connected plant asset.

7. The method of claim 6, further comprising:
determining, by the one or more processors, whether the user interface device is licensed to execute the function.

8. The method of claim 3, wherein the level of authorization for the user further includes at least one of: (i) a time duration in which the user is authorized to access the one or more plant assets or the one or more functions on the user interface device, or (ii) a plant area in which the user is authorized to access the one or more plant assets.

9. The method of claim 1, wherein the user interface device is configured for intrinsically safe operation by including an automatic shutdown mechanism in the user interface device to ensure that a component failure does not result in exceeding one or more electrical thresholds.

10. A user interface device for providing two-factor authentication within a process plant, the user interface device comprising:
one or more processors;
an integral input/output component for connecting to a plant asset within a process plant; and
a non-transitory computer-readable medium coupled to the one or more processors and the integral input/output component and storing instructions thereon, that when executed by the one or more processors, cause the user interface device to:
receive a first type of identification information for a user via a short-range communication link from an electronic identification card;
receive a second type of identification information for the user including user login information entered via the user interface device by the user;
compare each of the first and second types of identification information for the user to a plurality of types of identification information for a plurality of users who are authorized to access the user interface device; and
provide authorized access to the user when each of the first and second types of identification information correspond to a same authorized user;
wherein when the user has authorized access to the user interface device and the user interface device is connected to the plant asset, the user interface device is configured to communicate with the connected plant asset within the process plant via the integral input/output component to monitor, configure, troubleshoot, calibrate, or control the connected plant asset; and
wherein the user interface device is configured for intrinsically safe operation and an electrical characteristic of the user interface device is below an electrical threshold related to an intrinsic safety level.

11. The user interface device of claim 10, further comprising a user interface, wherein the instructions further cause the user interface device to:
display, on the user interface, a user login screen including one or more user controls for entering the user login information.

12. The user interface device of claim 10, wherein the instructions further cause the user interface device to:
determine a level of authorization for the user, wherein the level of authorization includes a set of permissions assigned to the user, including one or more plant assets the user is authorized to access or one or more functions that the user is authorized to execute on the user interface device; and
determine whether the user is authorized to access the connected plant asset based on the level of authorization for the user.

13. The user interface device of claim 12, wherein to determine a level of authorization for the user, the instructions cause the user interface device to:
obtain a set of permissions assigned to each of the plurality of users authorized to access the user interface device; and
identify the set of permissions assigned to the user.

14. The user interface device of claim 13, wherein the instructions further cause the user interface device to:
obtain a set of permissions assigned to the user interface device; and determine whether the user interface device is authorized to access the connected plant asset based on the set of permissions assigned to the user interface device.

15. The user interface device of claim 14, wherein when the user and the user interface device are authorized to access the connected plant asset, the instructions cause the user interface device to execute a function to perform an operation on the connected plant asset.

16. The user interface device of claim 15, wherein the instructions further cause the user interface device to:
determine whether the user interface device is licensed to execute the function.

17. The user interface device of claim 12, wherein the level of authorization for the user further includes at least one of: (i) a time duration in which the user is authorized to access the one or more plant assets or the one or more functions on the user interface device, or (ii) a plant area in which the user is authorized to access the one or more plant assets.

* * * * *